US006405923B1

(12) United States Patent
Seysen

(10) Patent No.: US 6,405,923 B1
(45) Date of Patent: Jun. 18, 2002

(54) METHOD FOR SECURE DISTRIBUTION OF DATA

(75) Inventor: Martin Seysen, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/673,657

(22) PCT Filed: Apr. 19, 1999

(86) PCT No.: PCT/EP99/02630

§ 371 (c)(1),
(2), (4) Date: Feb. 26, 2001

(87) PCT Pub. No.: WO99/59287

PCT Pub. Date: Nov. 18, 1999

(30) Foreign Application Priority Data

May 8, 1998 (DE) .......................................... 198 20 605

(51) Int. Cl.$^7$ ................................................. G06K 7/08
(52) U.S. Cl. .................... 235/451; 235/382; 235/437
(58) Field of Search ................................ 235/451, 382, 235/437

(56) References Cited

U.S. PATENT DOCUMENTS

| 5,299,263 A | | 3/1994 | Beller et al. |
| 5,513,133 A | | 4/1996 | Cressel et al. |
| 5,742,543 A | | 4/1998 | Fazio |
| 5,910,989 A | * | 6/1999 | Naccache ..................... 380/25 |
| 5,946,397 A | * | 8/1999 | M'Raihi et al. ............... 380/30 |
| 5,987,131 A | * | 11/1999 | Clapp .......................... 380/21 |
| 6,163,841 A | * | 12/2000 | Venkatesan et al. ........ 713/176 |
| 6,209,091 B1 | * | 3/2001 | Sudia et al. ................. 713/175 |

FOREIGN PATENT DOCUMENTS

| DE | 36 19 566 | | 12/1987 |
| DE | 38 22 540 | | 1/1990 |
| EP | 0 577 000 | | 1/1994 |
| EP | 0 578 059 | | 1/1994 |
| JP | 411346210 A | * | 12/1999 |

* cited by examiner

Primary Examiner—Michael G. Lee
Assistant Examiner—Daniel Walsh
(74) Attorney, Agent, or Firm—Bacon & Thomas, PLLC

(57) ABSTRACT

A method for secure distribution of data or programs, the transmitted data being provided with an electronic signature. The unit receiving the data or programs checks the electronic signature by executing a modular multiplication, thereby necessitating a multiplication and a division thereof. According to the invention, the unit receiving the data or program checks the signature by performing a modular multiplication according to the Montgomery method wherein an additional multiplication by a factor on the basis of base 2 and even exponents is performed.

2 Claims, No Drawings

METHOD FOR SECURE DISTRIBUTION OF DATA

BACKGROUND OF THE INVENTION

This invention elates to a methos for secure distribution of data and/or programs.

Methods for distribution of software SW by an issuing unit to a large number of like terminals or smart cards are being increasingly used in particular through the possibilities of telecommunication. The issuing unit generates an electronic signature of software SW using a public-key method in order to ensure the authenticity of software SW.

The issuing unit uses a commonly known method to calculate for software SW to be signed certificate M containing, along with other data, mainly hash value H(SW) dependent on the software. H(SW) is a publicly known hashing method. The issuing unit encrypts certificate M with its private key D. The result of said encryption is electronic signature S. The issuing unit sends software SW together with signature S to the terminal or smart card. There, value M of the generated certificate is calculated from signature S using public key $E=D^{-1}$ of the issuing unit. Further, the terminal or smart card, i.e. the receiving unit, calculates hash value H(SW) of software SW and tests whether H(SW) is correctly entered in certificate M. If this is the case, the receiving unit accepts software SW, otherwise it rejects software SW.

The best known public-key method for generating electronic signatures is the RSA method. A variant of the RSA method is the Rabin method or a variant of the Rabin method according to Williams.

The issuing unit randomly selects two primes P=3 mod 8 and Q=7 mod 8. These constitute the private key of the issuing unit. The public key is the value N=P*Q. For signing message M the issuing unit calculates the signature $$S=M^{1/2} \bmod (P*Q).$$

The receiving unit can verify the signature by calculating $$M=S^2 \bmod N.$$

The security of the Rabin method is based on the fact that it is easy to extract the square root of a number modulo a prime (if one exists), while extracting the square root of a randomly selected number modulo a composite number is at least as difficult as factorizing that composite number.

Not every number is a quadratic residue modulo prime P or Q; furthermore, quadratic residues mod P and Q normally have four square roots. Due to the special choice of P and Q, for any number M exactly one of the four numbers M, N−M, N/2 and N−M/2 is a quadratic residue mod P and mod Q (when M is odd N/2 is replaced by (M+N)/2 mod P*Q). This statement follows from the additional theorems for the quadratic reciprocity law.

If one requires for message M the additional condition M=4 mod 8, the following holds because of the relation N=P*Q=3*7=5 (mod 8):

$$M=0, N-M=1, M/2=2, M-N/2=3 \pmod 4$$

i.e. the four numbers M, N−M, M/2 and N−M/2 differ in the last two bit positions.

For signing message M the issuing unit first tests which of the four values M, N−M, N/2 or N−N/2 is a quadratic residue mod P and mod Q. This can be done effectively by calculating the Jacobian symbols (N/P) and (M/Q):

$M'=M$ if $(M/P)=1, (M/Q)=1$;

$M'=-M$ if $(M/P)=-1, (M/Q)=-1$;

$M'=M/2$ if $(M/P)=-1, (M/Q)=1$;

$M'=-M/2$ if $(M/P)=1, (M/Q)=-1$;

Let M' be the value meeting both conditions. The signature for message M is then:

$$S=(M')^{(P*Q-P-Q+5)/8} \bmod N$$

It thus holds that:

$$S^2=M'*(M')^{[(P-1)/2]*[(Q-1)/2]} \bmod N$$

Since M' is a quadratic residue mod P it follows by Fermat's small theorem that $(M')^{[(P-1)/2]}=1$ mod P. Analogously it holds that $(M')^{[(Q-1)/2]}=1$ mod Q. By the Chinese remainder theorem it further follows that $(M')^{[(P-1)/2]*[(Q-1)/2]}=1$ mod P*Q. It thus holds that $$S^2=M' \bmod N=P*Q.$$

For verifying signature S terminal B first calculates the value $$M'=S^2 \bmod N$$

Since when M=4 mod 8 is given the four possible values for M' differ in the last two bit positions, M can be easily calculated from M':

$M=M'$ if $M'=0 \bmod 4$;

$M=N-M'$ if $M'=1 \bmod 4$;

$M=2M'$ if $M'=2 \bmod 4$;

$M=2(N-M')$ if $M'=3 \bmod 4$;

For verifying a signature on the smart card or terminal B a modular multiplication is necessary; i.e. the receiving unit calculates:

$$M'=S*S \bmod N$$

This necessitates a multiplication and a division. The division is considerably more elaborate than the multiplication. The disadvantage of the known procedure for verifying a signature is thus that the software receiving unit, which usually has less computing capacity than the issuing unit, must perform a comparatively elaborate calculating operation.

It is known from Menezes, "Handbook of Applied Cryptography", 1997, CRC Press, New York, XP002112400, to verify an electronic signature using the Montgomery multiplication method.

European patent specification EP-A-0 566 498 discloses a method for secure distribution of data and/or programs wherein the data to be transmitted are provided with an electronic signature which is checked by the receiver. To check the signature the receiver implements modular multiplication according to the Montgomery method.

The disadvantage of known methods is that when software is distributed to units having low computer power, the verification of the signature reaches the limits of computer power.

SUMMARY OF THE INVENTION

It is therefore the object of the invention to state a method for secure distribution of software which avoids the above disadvantages.

This problem is solved by the characterizing feature of the present invention and the advantageous embodiments thereof.

It is therefore the problem of the invention to state a method for secure distribution of software which avoids the above disadvantages.

This problem is solved by the characterizing features of claim 1 starting out from the features of the preamble of claim 1.

Advantageous embodiments of the invention are stated in the dependent claims.

According to the invention one verifies the electronic signature using a method for implementing modular multiplication according to the Montgomery method instead of the usual standard methods for long-number arithmetic (trial division). The Montgomery method describes a faster method for modular multiplication calculating instead of the product $Z=X*Y$ modulo N the following value:

$$Z0 = X*Y*L^{-i} \bmod N$$

L is the basis on which the long-number arithmetic is performed. Typically $L=2^8$ is used with an 8-bit processor, $L=2^{16}$ with a 16-bit processor, etc. The value i must be at least great enough so as to fulfill the condition $$L^i > N.$$

The advantage of the Montgomery method is that the trial division step in modular multiplication is omitted. On the other hand, multiplication is additionally done by the undesirable factor $L^{-i}$ mod N. This undesirable effect can be compensated in modular exponentiation according to the RSA method as follows.

Calculation of an RSA exponentiation $A^E$ mod N is usually performed by repeated application of the laws of exponents $A^{2x}=A^x*A^x$ (mod N) and $A^{2x+1}=(A^x*A^x)*A$ (mod N). In the first step $X=(E/2)$ is set, and in the following steps X is replaced by $(X/2)$ until $X=1$ holds, $(X)$ being here the greatest integer $<=X$. Modular exponentiation thus in fact amounts to a sequence of squarings and multiplications based on A (mod N).

In modular exponentiation by the Montgomery method the following is calculated:

$$A0 = (A0*(L^{2i} \bmod N))*L^i \bmod N$$

This requires one Montgomery multiplication with the fixed value $L^{2i}$ mod N and it holds that $A0=A^{*Li}$ mod N. It obviously holds that:

$$A^{x}*A^{y}*L^i = (A^{x}*L^i)*(A^{y}*L^i)*L^i = A^{x+y}*Li \bmod N.$$

Using $(A^{x}*L^i)$ and $(A^{y}*L^i)$ the value $A^{x}*A^{y}*L^i$ can thus be calculated by a single Montgomery multiplication. Beginning with the value $A0=A^1*L^i$ the value $A^E*L^i$ can be easily calculated by repeated squaring and multiplying by A0. A further Montgomery multiplication of the intermediate result $A^E*L^i$ by 1 provides the desired final result $A^E$.

In modular exponentiation with an exponent selected randomly in the range 1, . . . , N a necessary compensation involves relatively low additional computing effort.

When software is downloaded to a terminal or smart card, the signature test must be performed there. Since the terminal normally has little computing power, the signature test must be realized as simply as possible.

In the conventional combination of Rabin's signature test with Montgomery multiplication, signature S is transferred to terminal B.

Terminal B calculates:

$$M0 = (S*S)*L^{-i} \bmod N$$

$$M' = (M0*(L^{2i} \bmod N))L^{-i} \bmod N$$

Obviously $M'=S^2$ mod N then holds. This method requires two Montgomery multiplications mod N and the value ($L^{2i}$ mod N) must also be stored in the receiving unit.

DESCRIPTION OF THE INVENTION

According to an advantageous embodiment of the invention, one performs the following modification which does not require a Montgomery multiplication or storage of the value ($L^{2i}$ mod N) unlike the conventional method. One transfers to the receiving unit instead of signature S the modified signature $$S' = S*L^{i/2} \bmod N$$

Since with commercial processors L is a straight power of two, $L^{i/2}$ can be easily calculated. The receiving unit now calculates by the Montgomery modular method the value $$(S'*S')* L^{-i} \bmod N = (S*L^{i/2}*S*L^{i/2})L^{-i} \bmod N = S^2 \bmod N = M' \bmod N.$$

According to an advantageous embodiment of the invention one therefore performs the following modification which does not require a Montgomery multiplication or storage of the value ($L^{2i}$ mod N) unlike the conventional method. One transfers to the receiving unit instead of signature S the modified signature $$S' = S*L^{i/2} \bmod N$$

Since with commercial processors L is a straight power of two, $L^{i/2}$ can be easily calculated. The receiving unit now calculates by the Montgomery method the value $$(S'*S')*L^{-i} \bmod N = (S*L^{i/2}*S*L^{i/2})L^{-i} \bmod N = S^2 \bmod N = M' \bmod N.$$

Thus the signature test requires only one Montgomery modular multiplication on the terminal.

According to the invention, secure distribution of data and/or programs is performed by first transmitting the data with an electronic signature generated by a public-key method to a unit. The electronic signature is then checked by performing a first modular multiplication, thereby necessitating a multiplication and a division thereof. Lastly, the electronic signature is checked by the unit by performing modular multiplication according to the Montgomery method, as described above.

When performing modular multiplication according to the Montgomery method, a factor selected having a base 2 and even exponents is derived. The unit issues the data and/or programs by multiplying the digital signature by the factor derived from the Montgomery modular multiplication resulting in the additional multiplication factor being canceled out at the unit receiving the data and/or programs.

What is claimed is:

1. A method for secure distribution of data and/or programs, the method comprising the steps of:

transmitting the data with an electronic signature generated by a public-key method to a unit;

checking said electronic signature by said unit by performing a first modular multiplication, thereby necessitating a multiplication and a division thereof; and checking said electronic signature by said unit by performing modular multiplication according to the Montgomery method;

wherein performing modular multiplication according to the Montgomery method, said method for secure distribution of data and/or programs further includes the step of performing a second modular multiplication according to the Montgomery method by a factor selected having a base 2 and even exponents, said unit issuing the data and/or programs multiplying the digital signature by said factor derived from the Montgomery modular multiplication whereby the additional multiplication factor is canceled out at the unit receivingbthe data and/or programs.

2. The method according to claim 1 wherein that the data and/or programs are transferred to a smart terminal or smart card.

* * * * *